US012603494B2

(12) United States Patent
Lindell et al.

(10) Patent No.: US 12,603,494 B2
(45) Date of Patent: Apr. 14, 2026

(54) REDUCING TRANSFORMER INRUSH CURRENT

(71) Applicant: ABB Schweiz AG, Baden (CH)

(72) Inventors: Elisabeth Lindell, Västerås (SE); Johan Nohlert, Västerås (SE); Stefan Halén, Västerås (SE); Jesper Magnusson, Åkersberga (SE); Andrea Bianco, Sesto San Giovanni (IT)

(73) Assignee: ABB Schweiz AG, Baden (CH)

( * ) Notice: Subject to any disclaimer, the term of this patent is extended or adjusted under 35 U.S.C. 154(b) by 191 days.

(21) Appl. No.: 18/337,920

(22) Filed: Jun. 20, 2023

(65) Prior Publication Data

US 2023/0420933 A1 Dec. 28, 2023

(30) Foreign Application Priority Data

Jun. 23, 2022 (EP) ..................................... 22180636

(51) Int. Cl.
*H02H 9/00* (2006.01)
*H01H 9/56* (2006.01)
*H02H 7/04* (2006.01)

(52) U.S. Cl.
CPC .............. *H02H 9/002* (2013.01); *H01H 9/56* (2013.01); *H02H 7/04* (2013.01)

(58) Field of Classification Search
CPC ............. H02H 9/002; H02H 7/04; H01H 9/56
See application file for complete search history.

(56) References Cited

U.S. PATENT DOCUMENTS

| | | | |
|---|---|---|---|
| 7,075,764 B2 | 7/2006 | Wahlroos et al. | |
| 8,310,106 B2 | 11/2012 | Koshiduka et al. | |
| 9,252,589 B2 | 2/2016 | Kai et al. | |

(Continued)

FOREIGN PATENT DOCUMENTS

| | | | |
|---|---|---|---|
| CN | 105281628 A | * | 1/2016 |
| CN | 109522615 A | | 3/2019 |

(Continued)

OTHER PUBLICATIONS

Translation of CN 105281628A. Jan. 27, 2016. (Year: 2016).*

(Continued)

*Primary Examiner* — Thienvu V Tran
*Assistant Examiner* — Christopher J Clark
(74) *Attorney, Agent, or Firm* — Whitmyer IP Group LLC

(57) ABSTRACT

A start-up method for reducing inrush current to a transformer when closing a switching device. The switching device includes three single-pole operated current interrupting means. The method includes monitoring a voltage. The method includes, for each of a sequence of iterations: at a same opening angle relative to a reference angle of the voltage, starting an opening sequence of the switching device; at a closing angle relative to the reference angle, which is shifted in relation to the closing angle of all other iterations in the sequence, starting a closing sequence of the switching device; and obtaining an indication of the overall inrush current resulting from the closing. The method includes selecting for future use with the opening angle, the closing angle of one of the iterations in which the overall inrush current is relatively low when compared with the other iterations of the sequence.

18 Claims, 3 Drawing Sheets

(56)  References Cited

U.S. PATENT DOCUMENTS

|  |  |  |  |
|---|---|---|---|
| 10,230,234 B2 | 3/2019 | Ijdir et al. | |
| 2017/0373486 A1 * | 12/2017 | Yamamoto | ............... H02H 7/04 |
| 2019/0371542 A1 * | 12/2019 | Lindell | ................. H01H 33/60 |

FOREIGN PATENT DOCUMENTS

|  |  |  |
|---|---|---|
| CN | 110703146 A | 1/2020 |
| EP | 3358588 A1 | 8/2018 |
| WO | 2016061866 A1 | 4/2016 |

OTHER PUBLICATIONS

Wu, Congwen, et al.; "Laboratory Investigation on Phase Selection Closing Approach for Suppression of Inrush Current"; 2019 IEEE 3rd Conference on Energy Internet and Energy System Integration (EI2); IEEE; Changsha, China; Nov. 8, 2019; 4 Pages.
Extended European Search Report; Application No. 22180636.7; Completed: Dec. 5, 2022; Issued: Dec. 16, 2022; 10 Pages.

* cited by examiner

REDUCING TRANSFORMER INRUSH CURRENT

TECHNICAL FIELD

The present disclosure relates to reducing inrush current to a transformer when closing a switching device arranged between an Alternating Current (AC) voltage source and the transformer in an electrical three-phase system.

BACKGROUND

Synchronization of circuit breakers relates to controlling that the opening and/or closing of electrical contacts occurs at a specific phase angle of a reference signal (voltage or current in the system). Most circuit breakers at the medium voltage level, i.e. within the range of 1 kV to 72 kV, are not using synchronized operation. One objective of using synchronized operation can be to minimize transformer inrush current. Different methods have been proposed for finding the optimal phase angle for the contact closing to reduce the transformer inrush current. The remanent flux in the transformer core will affect the optimal closing angle. Therefore, different methods for estimating the flux and take it into account have been proposed.

A problem with finding the optimal phase angle for circuit breaker closing in order to minimize the transformer inrush current is thus that the magnetic state of the transformer core will affect the optimal angle. It is a challenge to make a good estimation of the remanent flux in the transformer core. In literature, methods can be found where voltage sensors are installed downstream of the circuit breaker (in addition to upstream ones used for a reference signal) and the voltage is integrated with respect to time in order to give an estimated value of the remanent flux. The remanent flux as estimated can then be compared to the prospective flux that would be generated if closing at certain phase angles of the upstream voltage, and thereby an optimal angle can be found.

Alternatively, simulations of the site where the circuit breaker is going to be installed can be performed, taking into account the layout of the site and the load conditions of the transformer. Based on such simulations, attempts at finding the optimal phase angle can be done. This is however associated with uncertainties, since values of all required parameters may be difficult to obtain. Furthermore, methods relying on site-specific simulations require significant engineering efforts for each circuit breaker installation.

SUMMARY

It is an objective of the present invention to provide an alternative and less complex way of reducing transformer inrush current in an electrical AC system.

In accordance with the present invention, the switching device is during a start-up procedure closed at specific different closing angles for a number of iterations, following opening of the switching device at a same opening angle in each of the iterations, after which a preferred closing angle can be determined based on analysis of the inrush current during these iterations, to reduce the inrush current during future operation of the switching device. An advantage is that the remanent flux is taken into account without having to estimate it. The switching device is single-pole operated, implying that it comprises three independently operable current interrupting means, one per phase, e.g. single-phase breakers or contact pairs of a three-phase breaker. This is in contrast to a more common simultaneously-operated circuit breaker where the circuit breaker is opened or closed at the same time for all phases.

According to an aspect of the present invention, there is provided a start-up method for reducing inrush current to a transformer when closing a switching device arranged between an AC voltage source and the transformer in an electrical three-phase system. The switching device comprises three single-pole operated current interrupting means, one per phase. The method comprises, between the switching device and the voltage source, monitoring the voltage in one of the phases to determine a reference angle, e.g. the positive zero crossing of the voltage. The method also comprises, for each of a sequence of iterations: at a same opening angle relative to the reference angle of the monitored voltage, starting an opening sequence of the switching device, opening the switching device; at a closing angle relative to the reference angle, which is shifted in relation to the closing angle of all other iterations in the sequence, starting a closing sequence of the switching device, closing the switching device; and obtaining, e.g. for each of the phases, an indication of a peak value of the overall inrush current resulting from the closing of the switching device. The method also comprises selecting for future use with said same opening angle, the closing angle of one of the iterations in which the overall inrush current is relatively low when compared with the other iterations of the sequence.

According to another aspect of the present invention, there is provided a controller comprising processing circuitry, and data storage storing instructions executable by said processing circuitry whereby said controller is operative to perform an embodiment of the method of the present disclosure.

According to another aspect of the present invention, there is provided a switching device comprising an embodiment of the controller of the present disclosure, a voltage sensor for the monitoring of the voltage, and an inrush sensor for the obtaining of the indication of a peak value of the overall inrush current.

According to another aspect of the present invention, there is provided an electrical system comprising an embodiment of the controller of the present disclosure, an embodiment of the switching device of the present disclosure, and an embodiment of the transformer of the present disclosure.

According to another aspect of the present invention, there is provided a computer program product comprising computer-executable components for causing a controller to perform an embodiment of the method of the present disclosure when the computer-executable components are run on processing circuitry comprised in the controller.

As long as the switching device is always opened at the same opening angle, the remanent flux in the transformer core will be the same, as long as the system is not substantially altered, e.g. as long as the load conditions, and/or the layout of the system, are the same. By considering the inrush current for different closing angles, a closing angle which results in reduced inrush currents can be selected for future use within the system. Thus, there is no need to estimate the remanent flux in order to select a suitable closing angle. Only a single voltage, the voltage over time in one of the phases upstream of the switching device, needs to be monitored/measured in order to obtain a reference angle for the opening and closing angles. A three-phase system is envisioned but the invention could be used for any number of one or at least two AC phases.

The switching device is single-pole operated, i.e. it can open and close for each phase independently from the other phases. The term "opening" herein refers to when the contacts of the contact pair physically separate from each other, which due to arcing is not necessarily the same as breaking of the current, which may occur later when the contacts have moved sufficiently far from each other to extinguish the arc. Similarly, the term "closing" herein refers to when the contacts of the contact pair physically come into contact with each other, which due to arcing is not necessarily the same as making of the current, which may occur earlier when the contacts have moved sufficiently close to each other to cause a pre-arc. Control signalling may be adjusted in time to account for this arcing.

Since the switching device is single-pole operated, not all phases are necessarily opened or closed at the same time, why instead the terms "opening sequence" and "closing sequence" are used. The opening and closing sequences are the same (fixed) for each iteration, and can include opening or closing current interrupting means at the same time or at different times from the starting of the opening or closing sequence. If all the current interrupting means are not opened or closed at the same time during the opening or closing sequence, they are still opened or closed in a fixed temporal relation to each other during the opening or closing sequence. The starting of an opening sequence is the point in time when the contacts of a contact pair in the current interrupting means which is first to open are physically separated from each other. Similarly, the starting of a closing sequence is the point in time when the contacts of a contact pair in the current interrupting means which is first to close are coming into physical contact with each other. As discussed herein a preferred opening sequence may be to open a first one of the single-pole operated current interrupting means at the opening angle relative to the reference angle of the monitored voltage, and to open the other two of the single-pole operated current interrupting means one quarter of a period later. Alternatively, all the single-pole operated current interrupting means may be opened at the same time, at said opening angle. The period referred to herein is the period of the (waveform) of the monitored (reference) voltage. In this way, the respective arcing times may be more the same for all the phases, which may advantageously result in more even wear of the contacts of the different phases. Similarly, a preferred closing sequence may be to close all the single-pole operated current interrupting means at the closing angle relative to the reference angle, i.e. at the same time. However, an alternative closing sequence, e.g. when there is not enough remanent flux in the transformer core after the opening of the switching device, may be to close two of the single-pole operated current interrupting means at said closing angle, and to close the last one of the single-pole operated current interrupting means one quarter of a period later. Thus, an advantage with using single-pole operated current interrupting means in the switching device is that a closing angle where the resulting inrush current is low can be found even in cases with no significant levels of remanent flux.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc., for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
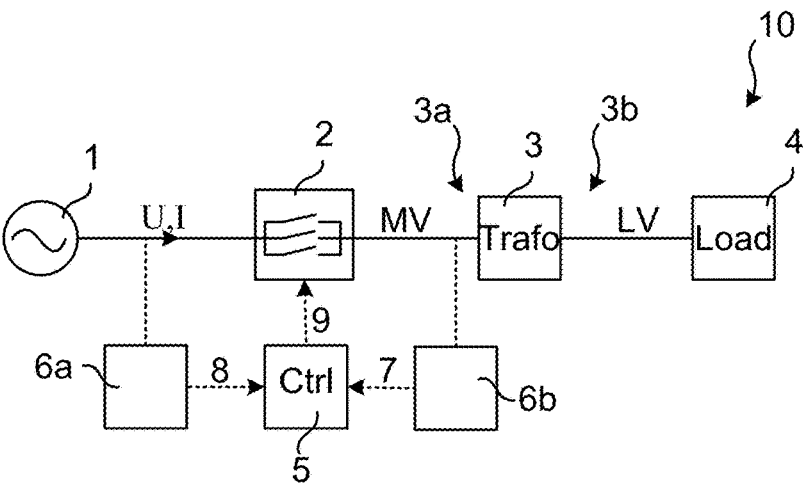
FIG. 1 is a schematic circuit diagram of an electrical system, in accordance with some embodiments of the present invention.

FIG. 1 illustrates an AC system 10 comprising an AC voltage source 1 and a transformer 3, and a switching device 2 connected between the voltage source and the transformer, and arranged to break a current I on the primary side 3a of the transformer. The switching device 2 is herein exemplified with a circuit breaker, but any other suitable switching device may alternatively be used. Optionally, a load 4, may be connected to the secondary side 3b of the transformer, and thus also be comprised in the system 10.

The voltage source 1 may provide an AC voltage within the medium voltage (MV) range, e.g. within the range of 1 kV to 72 kV for the root-mean-square (rms) value of the phase-to-phase voltage, but embodiments of the present invention may be used also for voltages U outside of this range. The multi-phase voltage provided by the voltage source is typically a three-phase voltage with a 120° phase shift between the voltages, each phase voltage being, or close to, sinusoidal and having a certain amplitude or rms value and frequency, e.g. 50 or 60 Hz. In some embodiments, the transformer 3 may be arranged to transform a MV at its primary side 3a to a low voltage (LV), i.e. an AC voltage of at most 1 kV, e.g. within the range of 10-1000 V, at its secondary side 3b. However, the transformer 3 may be any type of transformer, transforming any voltage at its primary side 3a to any, other or same, voltage at its secondary side 3b, e.g. from a higher voltage within the MV range mentioned above to any lower voltage within said MV range or LV range.

The circuit breaker 2 is single-pole operated, as discussed above, why an opening sequence or a closing sequence is started at a predetermined phase angle relative to the reference angle of the monitored voltage. In such a sequence, each of the current interrupting means may be opened or closed at the same time or at different times after the start of the sequence. Typically, the circuit breaker 2 is a vacuum circuit breaker, but other types of circuit breakers may also be used with some embodiments of the present invention.

A voltage sensor 6a of the system 10 may be used to monitor the voltage U in one of the phases, upstream of the circuit breaker 2, to provide a reference for the opening and closing angles of the circuit breaker. Since the voltages in the different phases are phase-shifted in relation to each other with a constant shift, it is enough to monitor only one of the phases. The voltage sensor 6a may send a reference signal 8 to a controller 5 of the circuit breaker 2. The controller 5 may be arranged to control the opening and closing of the circuit breaker 2 by means of a control signal 9 sent from the controller.

During normal operation, the controller 5 may be arranged to, when opening the circuit breaker 2, always open the circuit breaker (using the opening sequence) at the same opening angle relative to the reference angle of the monitored voltage U, and to, when closing the circuit breaker 2, always close the circuit breaker (using the closing sequence) at the same selected closing angle relative to the reference angle of the monitored voltage U (selected during the start-up method of the present invention). Optionally, during normal operation, the opening angle may be controlled to be different than the same opening angle used during the start-up method, e.g. to cause a more equal wear on the contacts. However, since the circuit breaker is single-pole operated, the wear may be made more uniform by not opening all single-pole operated current interrupting means at the same time during the opening sequence. Further, again during normal operation following the start-up method, the closing angle used may be controlled to be different than the selected closing angle, but typically based on the opening angle used directly prior to the closing of the circuit breaker. The voltage sensor 6a may be part of the controller 5, and the controller 5 and/or the voltage sensor 6a may be part of the circuit breaker 2 and/or be part of a control architecture of the system 10.

During the start-up method, an indication of a peak value of the overall inrush current to the transformer 3 upon closing the circuit breaker 2 is obtained, e.g. by means of an inrush sensor 6b, e.g. a current sensor and/or a voltage sensor, arranged to directly or indirectly sense the inrush current in each of the phases. Typically, the inrush sensor 6b may sense the inrush current on the primary side 3a of the transformer 3, upstream (i.e., towards the voltage source 1) or downstream (i.e., towards the transformer 3) of the circuit breaker 2. If the inrush sensor 6b is or comprises a current sensor, the inrush current may be sensed directly in each of the phases. Additionally, or alternatively, if the inrush sensor is or comprises a voltage sensor, the inrush current may be measured indirectly by measuring a voltage drop in each of the phases. There may be other ways of obtaining an indication of a peak value of the inrush current, e.g. by means of an inrush sensor 6b. For instance, the indication may be acoustic, e.g. sensed by an acoustic inrush sensor 6b, where a type and/or magnitude of sound produced by the inrush current may provide an indication of the peak value. The inrush sensor may thus, e.g. for each of the phases, provide the indication of a peak value of the inrush current resulting from the closing of the circuit breaker 2. This indication or other information thereof may be sent in a sensor signal 7 e.g., to the controller 5 or to another computer means for further processing. Also, the inrush sensor 6b may be comprised in the controller 5 and/or the circuit breaker 2.

The overall inrush current may be automatically estimated or calculated by the controller 5 based on information in the sensor signal 7 received from the inrush sensor 6b. The overall inrush current may be estimated or calculated e.g., as the highest absolute value of the peak inrush current among the phases, i.e., the highest absolute value of the inrush current in any phase, or as a mean absolute value of the peak inrush current among the phases.

Then, the selected closing angle may be automatically selected by the controller 5. Alternatively, the selected closing angle may for instance be selected by a human operator, e.g. based on a graphical representation (such as presented in FIGS. 2, for instance) of the peak value(s) of the inrush current presented to said operator. Selection by a human operator may be preferred if the sensing of the peak value(s) e.g., from an output of the inrush sensor 6b, is not clear enough for automatic selection. Thus, in some embodiments, the selecting of the closing angle for future use comprises receiving input from an operator, typically a human operator.

In accordance with some embodiments the present invention, the inrush currents are studied by obtaining an indication of a peak value, e.g. for each phase, of the inrush current. This is then done for each of a plurality of iterations wherein the same opening angle (relative to the reference angle of the monitored voltage) is used for all iterations, but the closing angle differs for each iteration. In this way, a suitable closing angle for future use during regular operation of the circuit breaker 2 can be selected. The different closing angles, one per iteration, may be spread, e.g. evenly spread (i.e. equidistantly), over a period of 360°, or a part of a period, of the waveform of the monitored phase voltage. For instance, if the voltage source 1 provides AC voltage of 50 Hz, the period thereof is 20 milliseconds (ms) during which time the phase angle makes a full turn from 0° to 360°. The number of iterations may be within the range of 6 to 36, corresponding to an angular shift (or distance) between any two consecutive closing angles in the sequence of iterations, if the closing angles are evenly spread over the period, of 60° to 10°, which in the case of a 50 Hz AC voltage U corresponds to a time shift (or distance) between the two consecutive closing angles of 3.333 ms to 0.555 ms. In an example, a time shift of 1 ms is used, implying 20 iterations for covering the whole period in case of 50 Hz, with an angular shift of 18°.

In some embodiments, the different closing angles, one per iteration, may be spread over only a part of a period, corresponding to a range of angles less than the full 0-360°. The part may be predetermined, e.g. based on prior knowledge on within which angular range to expect lower inrush current, or the sequence of iterations may be stopped prior to using all the closing angles prepared for, if a suitable closing angle to be selected has already been found.

Optionally, the start-up method may be performed for more than one same opening angle relative to the reference angle of the monitored voltage. This implies that iterations may first be performed for a first same opening angle, and then for a second same opening angle, optionally then for a third same opening angle, and optionally then for further opening angle(s). Alternatively, instead of performing the start-up method for more than one opening angle, from an assumption about 120 degrees phase shift between the different phases and knowledge about the phase sequence (including positive or negative polarity), one or several suitable combination(s) of opening and closing angles may be estimated based on results of the start-up method for a single same opening angle. However, as mentioned, then prior knowledge about the phase sequence (also called phase rotation) of the three-phase voltage of the voltage source 1 is needed.

Figure 2A:
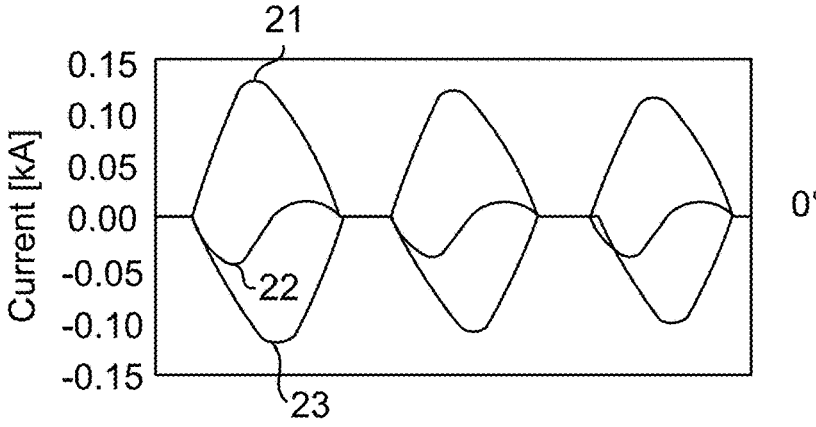
FIGS. 2A-2F are graphs showing transformer inrush currents of the three different phases over time after closing the switching device at different closing angles according to an example in accordance with the present invention.
Figure 2B:
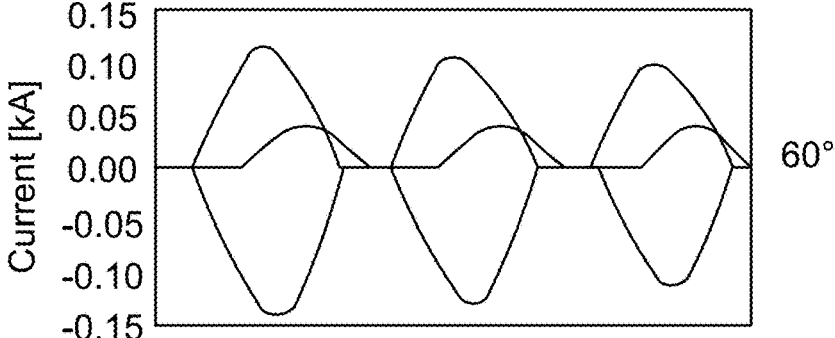
Figure 2C:
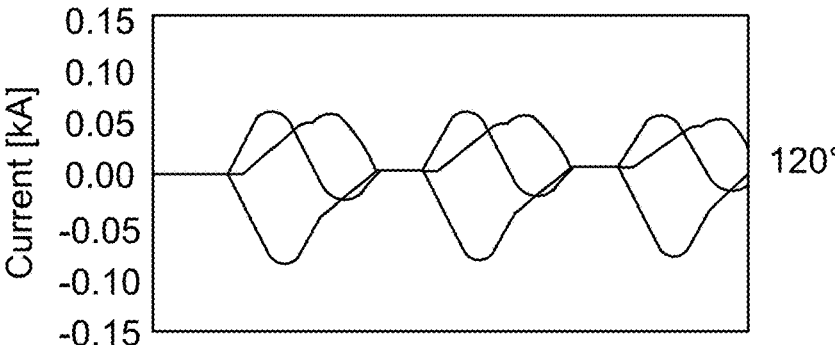
Figure 2D:
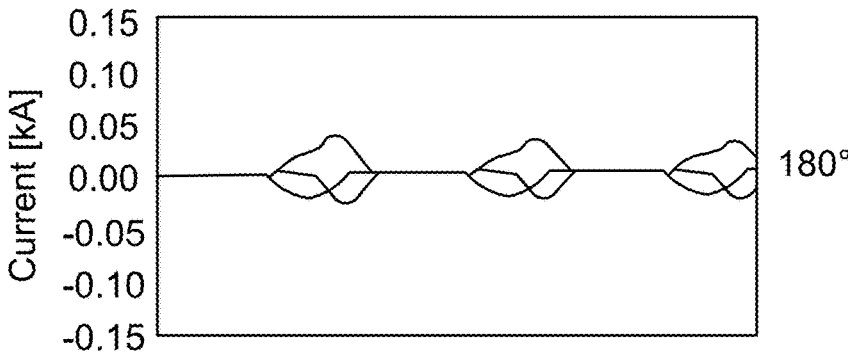
Figure 2E:
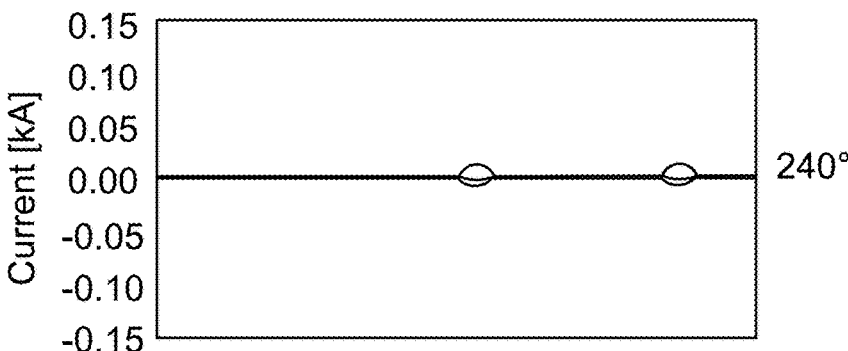
Figure 2F:
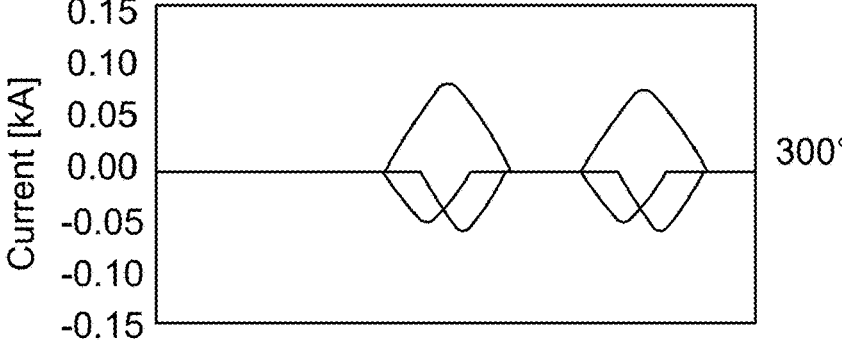

In the example of FIGS. 2A-2F, a sequence of six iterations are used, with equidistantly spread closing angles over one period of the monitored voltage U, whereby the angular distance between any two consecutive closing angles is 60°. As always, the same opening angle is used for each of the iterations in the sequence. As discussed herein, the closing (and opening) angles relate to the reference angle of the monitored voltage U. Thus, FIG. 2A shows the inrush current of each of the three phases at the closing angle of 0°, FIG. 2B shows the inrush current of each of the three phases at the closing angle of 60°, FIG. 2C shows the inrush current of each of the three phases at the closing angle of 120°, FIG. 2D shows the inrush current of each of the three phases at the closing angle of 180°, FIG. 2E shows the inrush current of each of the three phases at the closing angle of 240°, and FIG. 2F shows the inrush current of each of the three phases at the closing angle of 300°. Respective peak inrush currents 21, 22 and 23 are schematically marked for each of the three phases in FIG. 2A. From the FIG. 2 it is clear that in this example, e.g. when comparing the absolute values of the inrush currents, a closing angle of 240° is preferred.

Figure 3:
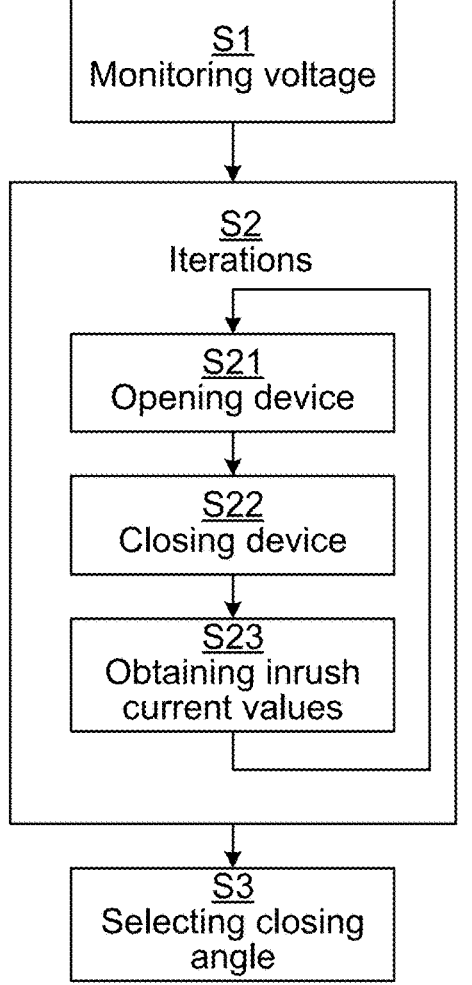
FIG. 3 is a schematic flow chart of the method of the present invention.

FIG. 3 illustrates some embodiments of the method of the present invention. The method is a start-up method for reducing inrush current to a transformer 3 when closing a circuit breaker 2 arranged between an AC voltage source 1 and the transformer in an electrical three-phase system 10. The circuit breaker comprises three single-pole operated current interrupting means, one per phase. The method comprises, between the circuit breaker 2 and the voltage source 1, monitoring S1 the voltage U in one of the phases to determine a reference angle, e.g. the positive zero crossing of the voltage. The method also comprises, for each of a sequence of iterations S2: at a same opening angle relative to the reference angle of the monitored S1 voltage, starting S21 an opening sequence of the circuit breaker 2, opening the circuit breaker; at a closing angle relative to the reference angle, which is shifted in relation to the closing angle of all other iterations in the sequence, starting S22 a closing sequence of the circuit breaker 2, closing the circuit breaker; and obtaining S23, e.g. for each of the phases, an indication of a peak value 21, 22 and/or 23 of the overall inrush current resulting from the closing of the circuit breaker 2. The method also comprises selecting S3 for future use with said same opening angle, the closing angle of one of the iterations in which the overall inrush current is relatively low when compared with the other iterations of the sequence.

In a general embodiment of the method of the present disclosure, the method is a start-up method for reducing inrush current to a transformer 3 when closing a circuit breaker 2. The circuit breaker comprises three single-pole operated current interrupting means. The method comprises monitoring S1 a voltage U. The method comprises, for each of a sequence of iterations S2: at a same opening angle relative to a reference voltage of the monitored voltage, starting S21 an opening sequence of the circuit breaker 2; at a closing angle relative to the reference angle, which is shifted in relation to the closing angle of all other iterations S2 in the sequence, starting S22 a closing sequence of the circuit breaker 2; and obtaining S23 an indication of the overall inrush current resulting from the closing. The method comprises selecting S3 for future use with said opening angle, the closing angle of one of the iterations S2 in which the overall inrush current is relatively low when compared with the other iterations of the sequence.

Figure 4:
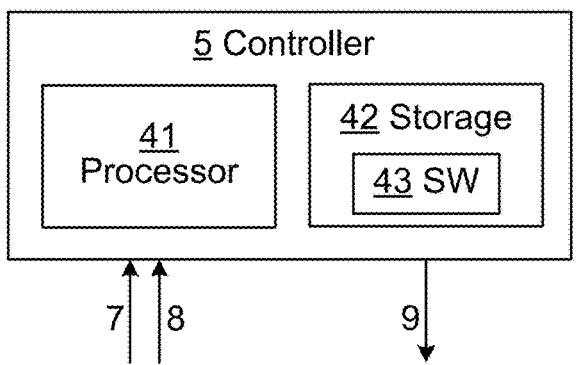
FIG. 4 is a schematic block diagram of a controller of the switching device, in accordance with some embodiments of the present invention.

FIG. 4 schematically illustrates an embodiment of the controller 5 of the present disclosure. The controller 5 comprises processing circuitry 41 e.g., a central processing unit (CPU). The processing circuitry 41 may comprise one or a plurality of processing units in the form of microprocessor(s). However, other suitable devices with computing capabilities could be comprised in the processing circuitry 41, e.g. an application specific integrated circuit (ASIC), a field programmable gate array (FPGA) or a complex programmable logic device (CPLD). The processing circuitry 41 is configured to run one or several computer program(s) or software (SW) 43 stored in a storage 42 of one or several storage unit(s) e.g., a memory. The storage unit is regarded as a computer readable means 42, forming a computer program product together with the SW 43 stored thereon as computer-executable components, and may e.g., be in the form of a Random Access Memory (RAM), a Flash memory or other solid-state memory, or a hard disk, or be a combination thereof. The processing circuitry 41 may also be configured to store data in the storage 42, as needed. The controller 5 may optionally comprise further devices, e.g. a transceiver for communication within the controller 5 or with other parts of the system 10, e.g. for receiving the reference signal 8 and/or the sensor signal 7, and/or for sending the control signal 9.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A start-up method for reducing inrush current to a transformer when closing a circuit breaker arranged between an AC voltage source and the transformer in an electrical three-phase system, the circuit breaker comprising only three single-pole operated current interrupting means, one per phase, the method comprising:

between the circuit breaker and the voltage source, monitoring a voltage in one of the phases;

for each of a sequence of iterations:

at a same opening angle relative to a reference angle of the monitored voltage, starting an opening sequence of the circuit breaker, opening the circuit breaker;

at a closing angle relative to the reference angle, which is shifted in relation to the closing angle of all other iterations in the sequence, starting a closing sequence of the circuit breaker, closing the circuit breaker;

obtaining an indication of a peak value of an overall inrush current resulting from the closing of the circuit breaker; and selecting for future use with said same opening angle, the closing angle of one of the iterations in which the overall inrush current is relatively low when compared with the other iterations of the sequence.

2. The method of claim 1, wherein the opening sequence is such that:

a first one of the three single-pole operated current interrupting means is opened at said same opening angle; and the other two of the three single-pole operated current interrupting means are opened one quarter of a period later.

3. The method of claim 1, wherein the opening sequence is such that all of the three single-pole operated current interrupting means are opened at said opening angle.

4. The method of claim 1, wherein the closing sequence is such that all of the three single-pole operated current interrupting means are closed at said closing angle.

5. The method of claim 1, wherein the closing sequence is such that:

two of the three single-pole operated current interrupting means are closed at said closing angle; and a third one of the three single-pole operated current interrupting means is closed one quarter of a period later.

6. The method of claim 1, wherein the closing angle is shifted in relation to the respective closing angles of the other iterations by the closing angles of all the iterations being equidistantly spread over a period of the monitored phase voltage, or a part of said period.

7. The method of claim 6, wherein the closing angles are equidistantly spread at an angular distance within the range of 10° to 60°, e.g. 18°, and/or at a time distance within the range of 0.55 to 3.33 ms, e.g. 1 ms.

8. The method of claim 1, wherein the obtaining of an indication includes measuring a current in each of the phases upon the closing of the circuit breaker by means of a current sensor on the primary side of the transformer.

9. The method of claim 1, wherein the obtaining of an indication includes measuring a voltage drop in each of the phases upon the closing of the circuit breaker by means of a voltage sensor on the primary side of the transformer.

10. The method of claim 1, wherein the voltage source provides a phase-to-phase voltage within the range of 1 kV to 72 kV.

11. The method of claim 1, wherein the circuit breaker is a vacuum circuit breaker.

12. A controller comprising:

processing circuitry; and data storage storing instructions executable by said processing circuitry whereby said controller is operative to perform a method for reducing inrush current to a transformer when closing a circuit breaker arranged between an AC voltage source and the transformer in an electrical three-phase system, the circuit breaker comprising only three single-pole operated current interrupting means, one per phase, the method including:

between the circuit breaker and the voltage source, monitoring a voltage in one of the phases;

for each of a sequence of iterations:

at a same opening angle relative to a reference angle of the monitored voltage, starting an opening sequence of the circuit breaker, opening the circuit breaker;

at a closing angle relative to the reference angle, which is shifted in relation to the closing angle of all other iterations in the sequence, starting a closing sequence of the circuit breaker, closing the circuit breaker;

obtaining an indication of a peak value of an overall inrush current resulting from the closing of the circuit breaker; and selecting for future use with said same opening angle, the closing angle of one of the iterations in which the overall inrush current is relatively low when compared with the other iterations of the sequence.

13. A circuit breaker comprising:

a controller having:

processing circuitry; and data storage storing instructions executable by said processing circuitry whereby said controller is operative to perform a method for reducing inrush current to a transformer when closing the circuit breaker arranged between an AC voltage source and the transformer in an electrical three-phase system, the circuit breaker comprising only three single-pole operated current interrupting means, one per phase, the method including:

between the circuit breaker and the voltage source, monitoring a voltage in one of the phases;

for each of a sequence of iterations:

at a same opening angle relative to a reference angle of the monitored voltage, starting an opening sequence of the circuit breaker, opening the circuit breaker;

at a closing angle relative to the reference angle, which is shifted in relation to the closing angle of all other iterations in the sequence, starting a closing sequence of the circuit breaker, closing the circuit breaker;

obtaining an indication of a peak value of an overall inrush current resulting from the closing of the circuit breaker; and selecting for future use with said same opening angle, the closing angle of one of the iterations in which the overall inrush current is relatively low when compared with the other iterations of the sequence, a voltage sensor for the monitoring of the voltage, and an inrush sensor for the obtaining of the indication of a peak value of the overall inrush current.

14. An electrical system comprising:

a transformer; and a circuit breaker, which includes a controller having:

processing circuitry; and data storage storing instructions executable by said processing circuitry whereby said controller is operative to perform a method for reducing inrush current to the transformer when closing the circuit breaker arranged between an AC voltage source and the transformer in the electrical system, the electrical system being an electrical three-phase system, the circuit breaker comprising only three single-pole operated current interrupting means, one per phase, the method including:

between the circuit breaker and the voltage source, monitoring a voltage in one of the phases;

for each of a sequence of iterations:

at a same opening angle relative to a reference angle of the monitored voltage, starting an opening sequence of the circuit breaker, opening the circuit breaker;

at a closing angle relative to the reference angle, which is shifted in relation to the closing angle of all other iterations in the sequence, starting a closing sequence of the circuit breaker, closing the circuit breaker;

obtaining an indication of a peak value of an overall inrush current resulting from the closing of the circuit breaker; and selecting for future use with said same opening angle, the closing angle of one of the iterations in which the overall inrush current is relatively low when compared with the other iterations of the sequence, a voltage sensor for the monitoring of the voltage, an inrush sensor for the obtaining of the indication of a peak value of the overall inrush current.

15. A computer program product comprising computer-executable components, which when run on processing circuitry of a controller, causes the controller to perform a method for reducing inrush current to a transformer when closing a circuit breaker arranged between an AC voltage source and the transformer in an electrical three-phase system, the circuit breaker comprising only three single-pole operated current interrupting means, one per phase, the method including:

between the circuit breaker and the voltage source, monitoring a voltage in one of the phases;

for each of a sequence of iterations:

at a same opening angle relative to a reference angle of the monitored voltage, starting an opening sequence of the circuit breaker, opening the circuit breaker;

at a closing angle relative to the reference angle, which is shifted in relation to the closing angle of all other iterations in the sequence, starting a closing sequence of the circuit breaker, closing the circuit breaker;

obtaining an indication of a peak value of an overall inrush current resulting from the closing of the circuit breaker; and selecting for future use with said same opening angle, the closing angle of one of the iterations in which the overall inrush current is relatively low when compared with the other iterations of the sequence.

16. The method of claim 2, wherein the closing sequence is such that all of the three single-pole operated current interrupting means are closed at said closing angle.

17. The method of claim 2, wherein the closing sequence is such that:

two of the three single-pole operated current interrupting means are closed at said closing angle; and a third one of the three single-pole operated current interrupting means is closed one quarter of a period later.

18. The method of claim 2, wherein the closing angle is shifted in relation to the respective closing angles of the other iterations by the closing angles of all the iterations being equidistantly spread over a period of the monitored phase voltage, or a part of said period.

* * * * *